Patented July 9, 1940

2,206,928

UNITED STATES PATENT OFFICE 2,206,928

PRODUCTION OF CONDENSATION PRODUCTS

Heinrich Ulrich, Ludwigshafen-on-the-Rhine, and Joseph Nuesslein, Frankfort-on-the-Main, Germany, assignors to I. G. Farbenindustrie Aktiengesellschaft, Frankfort - on - the - Main, Germany No Drawing. Application January 11, 1939, Serial No. 250,356. In Germany February 17, 1928

9 Claims. (Cl. 260—404)

The present application is a continuation-in-part of the application Serial No. 340,015, filed in the names of Heinrich Ulrich and Joseph Nuesslein on February 19, 1929.

The present invention relates to the manufacture of dispersing agents.

We have found that condensation products which are very valuable, for example as dispersing agents, are obtained by condensing hydroxyalkyl amines containing at least two amino nitrogen atoms with higher organic acid substances (which expression is intended to include for the purposes of the present application higher organic acids, preferably such as contain at least 8 carbon atoms in the molecule, and their esters and halides). In the said condensation one or more reactive hydrogen atoms of the said hydroxyalkyl amine are substituted by the radicle of the acid employed. Thus esters or amides or esters-amides of the hydroxyalkyl amine or mixtures thereof may be formed depending on the constitution of the initial materials.

The temperature employed for condensation is usually above 80° C., but in most cases a temperature above 100° C. is applied by-and-by in order to accelerate the reaction, which may be further accelerated by adding a condensing agent, such as are usual for such reactions in the organic chemistry, for example zinc chloride and the like. Temperatures above 250° C. are usually not applied in order to avoid the formation of dark products.

The said amines may contain one or several alkylol groups. As alkylol di- or polyamines which can be employed with advantage there may be mentioned for example the alkylol derivatives of ethylene diamine or diethylene triamine and the like.

The acids employed for the condensation may be chosen from higher molecular mono- or di- or other polybasic organic acids, such as the higher molecular fatty acids, for example stearic, oleic or ricinoleic acid and the like, aromatic or hydroaromatic mono- or polybasic acids, such as naphthenic, phthalic or hexahydrophthalic acids and the like, heterocyclic carboxylic acids, such as quinoline carboxylic acid, sulphonic acids of organic compounds, such as the sulphonic acids of aliphatic compounds or of aromatic, hydroaromatic or heterocyclic compounds. Particularly suitable acid components are the sulphonic acids of aromatic, and preferably of polynuclear, compounds which contain an aliphatic side-chain or one or more halogen atoms, hydroxy, amino or alkylamino groups or several of such substituents. The condensation with these acids goes on with the splitting off of water. Instead of the free acids their halides or esters can be employed which under the conditions of working may react like the free acids and give the same condensation products of the hydroxyalkyl amines. In this case hydrogen halide or alcohols are split off in the condensation. The manner of production of several of the condensation products will be explicitly illustrated below by way of examples though the methods of producing them follow the usual lines of esterifying an alcohol with an acid or of converting an amine into an amide.

When alkylol polyamines serve as initial components in which hydrogen is directly attached to nitrogen and when a quantity of the higher organic acid substance exceeding that theoretically required for acylating the amino groups capable of being acylated, is used while heating the amide first formed is further converted into the ester-amide of the amine. The same reaction can also be performed after the formation and separation of the amide and it is obvious that in the latter reaction higher molecular organic acids can be used which are different from those employed for the amidation. If the treatment of the amides with the acids is performed at a low temperature, say at about room temperature, or up to about 50° or 60° C., salts of the said compounds are obtained which can be converted into the ester-amides by heating.

On the other hand the esters or amides or the ester-amides can be converted also into salts of organic acids or of inorganic acids, such as formic, acetic, lactic acid, halogen hydrides, sulphuric acid or of the aforesaid higher molecular organic acids.

In such condensation products as still contain reactive hydrogen connected with a nitrogen atom, the said hydrogen may be substituted by an alkyl group, which may also contain a hydroxyl group, in the usual manner of alkylating amines.

In many cases the usefulness of the products obtained for the purposes hereinbefore described is increased in their application by the addition of other dispersing agents, such as are known in the art as wetting agents, for example soaps or substances of a saponaceous nature, such as saponines, cholates, synthetic wetting agents and the like, or protective colloids, such as animal or vegetable glues, or gums, gelatine, or sulphite cellulose waste liquor and the like, or organic solvents, or several of these substances. By means of the said products in particular even organic solvents can be dissolved or emulsified in water to a considerable extent and products are thus obtained which are excellently suitable, for example for wetting, cleansing, washing, bleaching and dyeing textiles, and for emulsifying and dispersing other substances according to the requirements in the textile, leather or lacquer and varnish industries.

The following examples will further illustrate how this invention may be carried into practical effect, but the invention is not restricted to these examples. The parts are by weight.

*Example 1*

100 parts of olive oil and 48 parts of N.N'-tetraethanol ethylene diamine, obtainable by treatment of ethylene diamine with ethylene oxide at from 5° to 30° C., are slowly heated to 180° C., until an acidified sample of the reaction mixture is soluble in water.

About 100 parts of a neutral soap are then added to the product, which latter consists of esters of the fatty acids contained in the olive oil with the above mentioned amine. A fulling bath is mixed with about 5 per cent of its weight of the product. By treating woolen goods with this fulling bath, even when the solution shows an acid reaction, a good fulling effect, a good protection of the fibre and a good preservation of the color are obtained, even in cases where the goods cannot withstand the ordinary fulling. If there are insoluble impurities to be removed, for example specks of pitch, mineral oil stains and the like, organic solvents are added to the said ingredients, and although the organic solvents are not soluble in water, by stirring with the condensation product beforementioned, either alone or in combination with soaps, they become soluble.

*Example 2*

105 parts of monoethanol ethylene diamine ($NH_2$—$C_2H_4$—$NH$—$C_2H_4OH$), or of a similar amine containing more than 2 nitrogen atoms, such as monoethanol triethylene tetramine ($NH_2$—$C_2H_4$—($NH$—$C_2H_4$)$_2$—$NH$—$C_2H_4OH$), are condensed with an equimolecular proportion of naphthenic acid. In the case of starting with monoethanol ethylene diamine a product corresponding to the formula

R—CO—NH—$C_2H_4$—NH—$C_2H_4OH$ in which R—CO— denotes the naphthenic acid radical is obtained; it possesses a very high cleansing action and yields particular advantages in fulling or felting wool with an acid solution.

*Example 3*

Equimolecular proportions of oleic acid and of the reaction product, obtainable by acting with 2 molecular proportions of ethylene oxide on 1 molecular proportion of diethylene triamine, are heated together to about 180° C., until a sample is soluble in water. The product itself which probably consists mainly of

as well as salts thereof possess an efficient wetting action. 1 molecular proportion of the product can be further treated with 2 molecular proportions of oleic acid.

Instead of the said hydroxyethylated diethylene triamine hydroxyalkyl amines can be employed which contain four or more nitrogen atoms in their molecule.

What we claim is:

1. Condensation products from an amine containing at least one hydroxyalkyl group and at least two amino nitrogen atoms on the one hand and from at least one higher molecular organic acid substance on the other hand.
2. Condensation products from a hydroxyalkylated polyamine and a higher molecular organic acid substance.
3. Condensation products from a hydroxyalkylated polyamine and a higher molecular fatty acid substance.
4. Condensation products from a hydroxyalkylated diamine and a higher molecular organic acid.
5. Condensation products from a hydroxyalkylated diamine and a higher molecular fatty acid.
6. Condensation products from a hydroxyethylated ethylene diamine and a higher molecular organic acid.
7. The condensation product from N.N'-tetrahydroxyethyl ethylene diamine and olive oil.
8. The condensation product from monohydroxyethyl ethylene diamine and naphthenic acid.
9. The condensation product from dihydroxyethyl diethylene triamine and oleic acid.

HEINRICH ULRICH.
JOSEPH NUESSLEIN.